(12) United States Patent
Tittenhofer (10) Patent No.: US 10,826,612 B2
(45) Date of Patent: Nov. 3, 2020

(54) POWER SUPPLY

(71) Applicant: Cisco Technology, Inc., San Jose, CA (US)

(72) Inventor: Michael Tittenhofer, Fuerth (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/674,072

(22) Filed: Nov. 5, 2019

(65) Prior Publication Data
US 2020/0145107 A1    May 7, 2020

(30) Foreign Application Priority Data

Nov. 6, 2018  (GB) .................................. 1818115.6

(51) Int. Cl.
*H04B 10/00* (2013.01)
*H04B 10/40* (2013.01)
*H04B 10/80* (2013.01)
*H04J 14/00* (2006.01)

(52) U.S. Cl.
CPC ........... *H04B 10/40* (2013.01); *H04B 10/808* (2013.01)

(58) Field of Classification Search
CPC .......... H04B 10/40; H04B 10/43; H04B 1/38; H04B 5/02
See application file for complete search history.

(56) References Cited

U.S. PATENT DOCUMENTS

2016/0226217 A1*  8/2016  Jia ........................ H04B 10/40
2019/0326993 A1* 10/2019  Zheng .................. G02B 6/4274

FOREIGN PATENT DOCUMENTS

JP    2008227863 A    9/2008

OTHER PUBLICATIONS

Combined Search and Examination Report in counterpart GB Application No. 1818115.6, dated May 8, 2019, 6 pages.

* cited by examiner

*Primary Examiner* — Daniel G Dobson
(74) *Attorney, Agent, or Firm* — Edell, Shapiro & Finnan, LLC (57) ABSTRACT

A host card is provided for supplying power to a transceiver module through a transceiver interface. The host card established a connection of the transceiver module with the transceiver interface. The transceiver module is operable in a low power mode and a high power mode. The host card requests module identification information from the transceiver module. In response to receiving the module identification information, the host hard verifies a module power condition and modifies an output voltage provided by a primary host power supply if the module power condition is verified.

20 Claims, 7 Drawing Sheets

POWER SUPPLY

PRIORITY CLAIM

This application claims priority to United Kingdom Patent Application No. 1818115.6, filed Nov. 6, 2018, the entirety of which is incorporated herein by reference.

TECHNICAL FIELD

The present disclosure relates generally to a method and apparatus for providing power to a transceiver module.

BACKGROUND

Modern communications systems employ a variety of networking hardware, such as servers, routers and switches which communicate via fibre optic or electrical connections. Transceivers are employed at the interfaces between the connecting optical fibres or electrical cables at the server or switch.

In optical systems, transceivers perform conversions between optical and electrical signals. One category of transceiver is the small form-factor pluggable (SFP) family of transceivers. SFP interfaces support various communications standards such a synchronous optical networking (SONET)/synchronous digital hierarchy (SDH), Gigabit Ethernet, Fibre Channel, Data Center, Infiniband and others.

Particular examples of SFP transceivers include Quad-SFP (QSFP) and Octal-SFP (OSFP). The form and function of these transceivers is defined by a (respective) multi-source agreement (MSA) overseen by, for example, the Small Form Factor Committee. The effective standards outlined in the MSAs relating to the respective transceivers ensure that host modules and transceivers produced by different manufacturers are inter-compatible. In order to achieve this, not only the form of the interconnections, but also the operational characteristics of the devices are typically specified in order that devices function properly.

Electrical signal contact and channel assignments, and electrical and power requirements are defined in the respective MSA for each of the SFP form factors, and these definitions ensure that the pluggable modules and cable assemblies are functionally interchangeable.

BRIEF DESCRIPTION OF THE DRAWINGS

Examples of the present disclosure will now be explained with reference to the accompanying drawings in which.

Throughout the description and the drawings, like reference numerals refer to like parts.

DESCRIPTION OF EXAMPLE EMBODIMENTS

Overview

A method for powering up a transceiver module at a host card is provided, comprising, at a host card comprising a transceiver interface, establishing the connecting of a transceiver module to the transceiver interface, the transceiver module being operable in low power and a high power mode; requesting module identification information from the transceiver module; and in response to receipt of the module identification information, verifying a module power condition, and if the module power condition is verified, modifying an output voltage provided by a primary host power supply.

EXAMPLE EMBODIMENTS

With increasing demands for higher data rates, the requirements of an MSA can be limiting, particularly with respect to the power that can be supplied by a host card to a transceiver module through the electrical connection pins present on the module and module interface (known as a module "slot") on a host card. As will be appreciated, higher data rates place higher power burdens on transceiver modules.

Taking the QSFP Double Density (QSFP-DD) MSA as an example, six power supply pins rated at 1A are provided. The maximum power which can be provided to the transceiver, at a max rating of 3.3V per pin is therefore 19.8 W.

Figure 1:
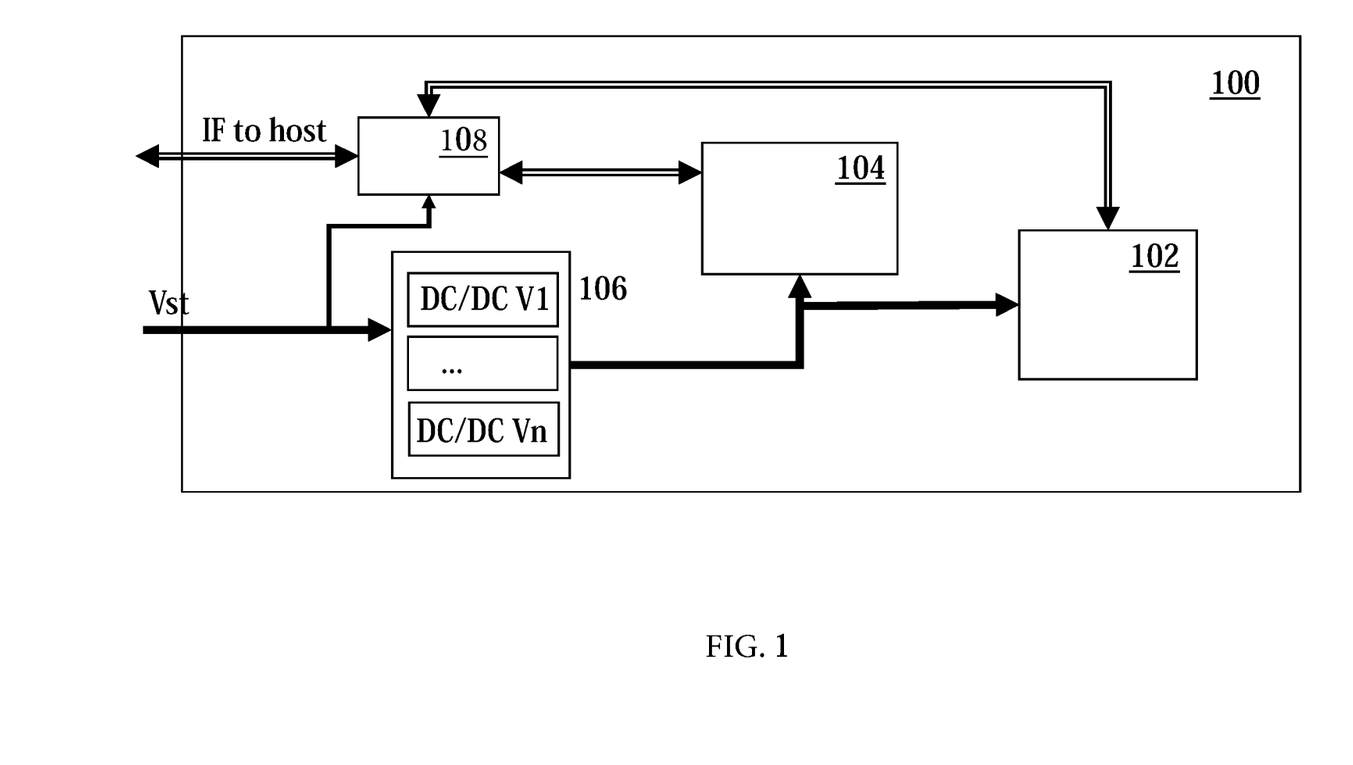
FIG. 1 is a block diagram of a transceiver module.

FIG. 1 shows a block diagram of a transceiver module 100. The transceiver module 100 has an optical module 102 for providing optical communication between the transceiver module 100 and a fibre optic cable (not shown) when the fibre optic cable is plugged into the optical module 102. The transceiver module 100 further comprises a module digital signal processor (DSP) 104. The optical module 102 is operable to convert optical signals received at the transceiver module into electrical signals, and vice versa. Both module DSP 104 and optical module 102 are connected to a DC (direct current) to DC circuitry 106. DC to DC (DC/DC) circuitry 106 receives a module supply voltage Vst from a module to which the transceiver module 100 is connected. DC/DC circuitry 106 is arranged to provide the internal voltages from the optical module 102 and module DSP 104, such as required. The internal voltages which are required by the DSP and optical module 102 will depend on the specifics of the transceiver module 100. In general, DC/DC circuitry 106 will be arranged to output a range of voltages from V1 to Vn, based on the standard module supply voltage Vst. Where the QSFP standard is used (and in others also) input and output voltage, Vst is set to 3.3V.

The optical module 102 comprises one or more optical physical media dependent (PMD) interface, comprising one or more electro-optical transmitters and receivers, for processing optical signals in and out of the module.

Receivers consist of one or more parallel photo receivers and adaptation circuitry, such as TIAs (transimpedance amplifiers). A transmitter typically comprises one or more parallel electrical amplifiers, optical modulators, and lasers. Additional to the transmit and receive chain an optical module 102 typically also includes control and bias circuitry for the transmitter and receiver. Depending on the actual module some or all of these elements may be present. From a physical point of view these components can themselves be discrete on the host board or complete or partially co-packaged within a separate mechanical housing. (e.g.:

TOSA (transmitter optical sub-assembly); ROSA (receiver optical sub-assembly); TROSA (Transmitter-Receiver Optical Subassembly))

Transceiver module 100 also comprises a digital signal processing unit (DSP) 104 performing module management and control functions and also transforming the analogue signals from the optical module into a digital data stream which is sent to the host over the high speed interface. This is a typical implementation. Variants of modules in which the analogue signals are sent directly to the host being then processed on the host also exist. In that case the DSP will only perform the module management and control functions the data processing as described above may comprise decoding and encoding data for the physical media, error correction, data stream monitoring, encryption and decryption etc.

The DSP receives the module supply voltage Vst, and is connected to the optical module 102, and to the host IF or host adaptation circuit 108. The IF to host adaptor provides the output signal from the transceiver module 100.

The module supply voltage Vst and IF signals are received and transmitted across an electrical interface (not shown) comprising a plurality of pins that provide the electrical communication between the transceiver module 100 and a network device (also not shown) when the transceiver module 100 is inserted into a recess, or slot of the network device.

Figure 2:
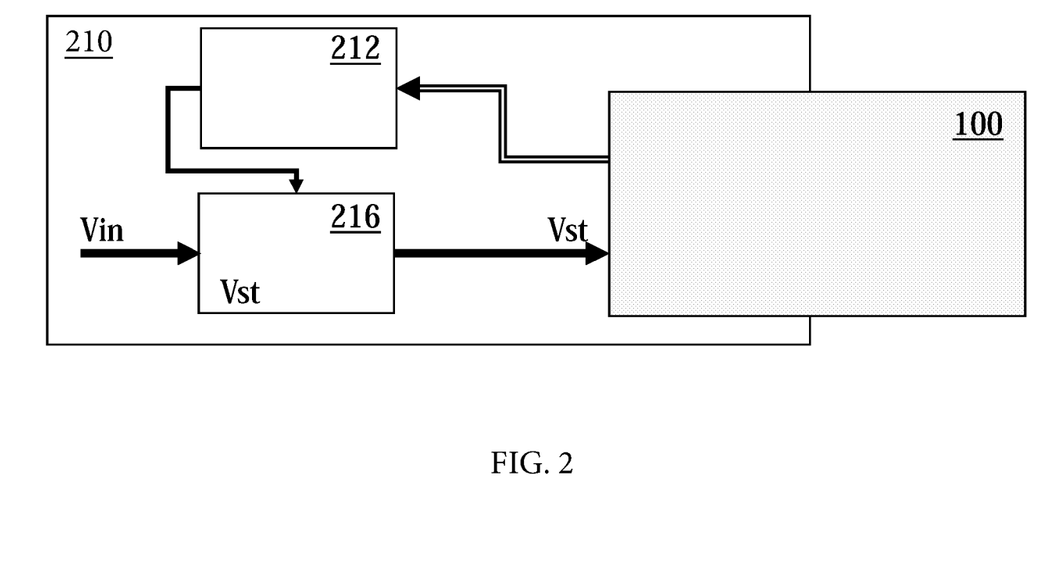
FIG. 2 is a block diagram of a host card having a slot for receiving a transceiver module.

FIG. 2 shows a host card arrangement. Host card 210 has a host controller 212, and a host power supply 216. The host card 210 has a transceiver module 100 connected into a host slot (not shown). The transceiver module 100, when placed in the host slot communicates with the host controller 212 via an electrical interface as described above. The host slot amounts to a transceiver interface.

The management interface of a module (based on the example of QSFP-DD, the details for other modules types may differ but the basic principle described is the same) typically consists of several pins indicating a status or alarm of the module towards the card and control pins from the card towards the module to set the module into a certain state. To indicate a certain status these pins can take voltages between 0V and Vst. Additional to these static pins the management interface has a digital serial communication channel represented by a 2-wire serial interface operated with a I2C (Inter-Integrated Circuit) protocol over which complex messages can be exchanged. In alternative arrangements, the management interface may be an optical interface, or a wireless interface.

The high speed data interface consists of 8 differential data channels in a transmit direction and 8 differential channels in a receive direction. These lines carry the data sent and received over the optical interface of the module, electrically to and from the card. Depending on the actual module type and data rate frequency and encoding of these signals can vary. Details of the electrical specifications are standardized in various standards, e.g. 802.3ba Annex 86A, 802.3bs Annex 120E or Annex 120C, FC-PI-6, FC-PI-7, OIF-CEI-28G-VSR, OIF-CEI56G-VSR or the InfiniBand specification. Host power supply 216 receives power from the card power supply (Vin), and provides power to the transceiver module 100.

While embodiments of the present invention apply to a wide variety of existing and foreseen transceiver modules, the following non-limiting example relates to a QSFP/OSFP module.

In the standard arrangement of a QSFP module which can apply to the arrangement shown in FIG. 1 and FIG. 2, in general a transceiver module has two power modes: low power mode and high power mode. Furthermore, multiple power classes of transceiver module exist, depending on the use to which they are put. The different power classes exist to accommodate differing data rates and longer reaches between networking devices. Since a wide range of module power classes exist, to avoid exceeding power supply limits and cooling capacity when a transceiver module 100 is inserted onto a host card slot as in FIG. 2, the QSFP MSA recommends that a state machine be implemented to identify the power class of a module, before permitting a module to go into high power mode.

In order to avoid exceeding host system power capacity, upon hot plugging, power cycle, or re-set, QSFP modules power up in low power mode.

An approach for powering up a QSFP transceiver module will now be described. In a first state, the host card is powered, however the transceiver module slot is unpowered. When a module is plugged into the slot an interface pin on the electrical interface changes state, and the host card controller recognises the state change of the pin. The host controller 212 then enables the host power supply 216 to provide standard voltage Vst to a transceiver module 100. The host card 210 sets a module interface pin (to high), and the transceiver module 100 then boots into a low power mode. During this process still no communication is possible over the low speed digital interface, or management interface with the host controller 212. Once the module reaches low power mode communication between the host controller 212 and the transceiver module 100 is established. The host controller 212 configures the transceiver module for high power mode using the low speed digital management interface, and subsequently enables the transition to the high power mode as defined in the MSA and the transceiver module 100 boots into its high power mode. Communication now takes place on a high speed interface (not shown), the transceiver module 100 and host card are now in the non-operation mode.

The removal of the transceiver module will now be described. While the module is running, if the module is unplugged, independent of which state the transceiver module 100 is in, an interface pin (ModSelL) is pulled low, and the pin changes state. The host controller 212 recognises the state change, and disables the host power supply 216. The host card 210 is now in a state to receive a transceiver module 100 into the transceiver module slot. Effectively, then the host card power supply has one operating state. The power supply may be turned off altogether, and therefore output 0V, or at all other times in operation it will output a standard voltage, Vst.

Figure 3:
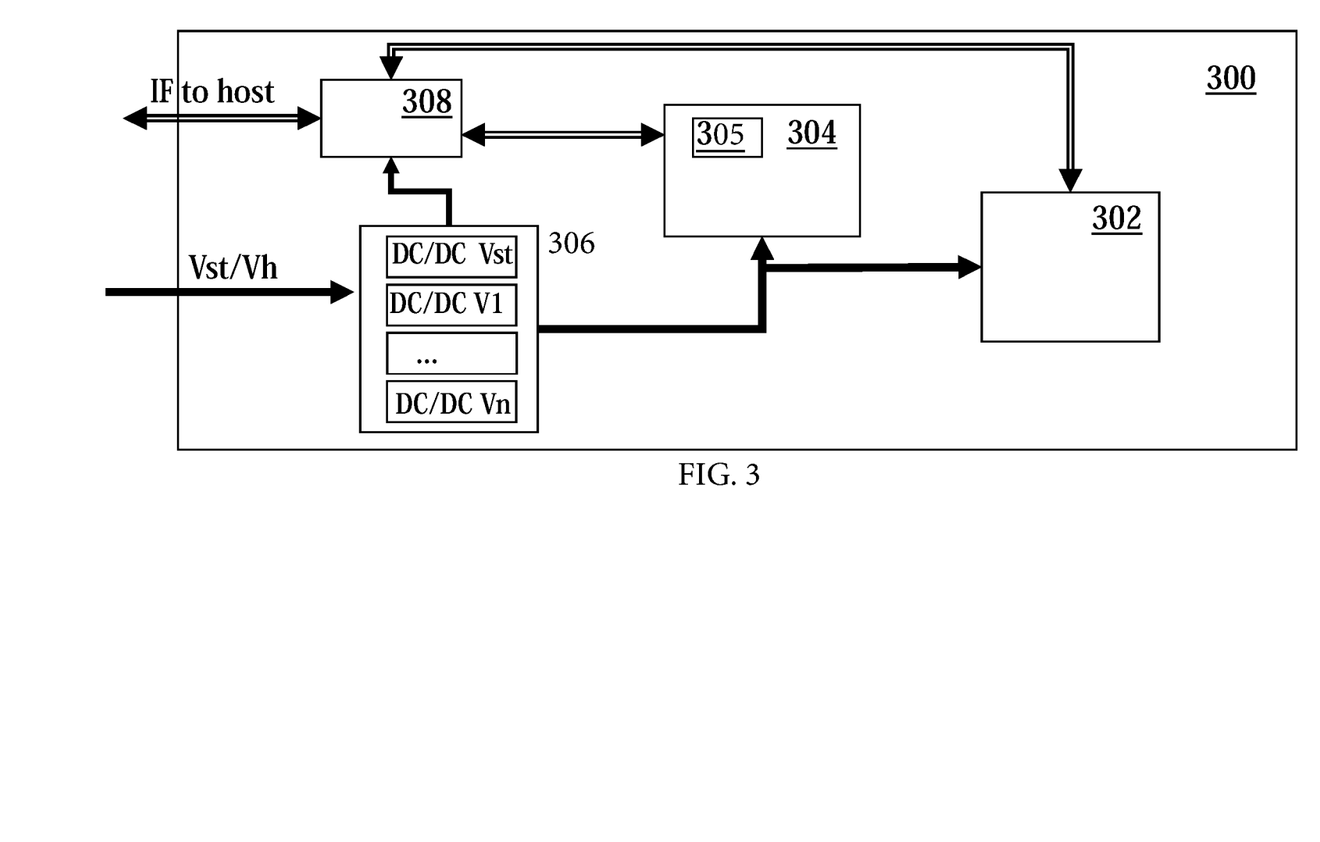
FIG. 3 is a block diagram of a transceiver module.

FIG. 3 shows a transceiver module with alternative power supply. It has similar characteristics to those present in the standard transceiver module shown in FIG. 1. Module power supply 306 receives the module power supply at Vst (standard voltage) or Vh (high power voltage). Module power supply 306 provides internal voltages to the module DSP 304 and optical module 302 as before. The module power supply 306 comprises a power converter which is arranged to receive the low power mode voltage as well as the high power mode voltage, and provide the requisite internal voltages for the transceiver module.

The IF adaptation 308 to host receives 3.3V power from the module power supply 306 at Vst, rather than from the module supply in, as in the arrangement shown in FIG. 1. This is because the transceiver module 300 is arranged to receive the module supply voltage at Vst or Vh.

Module DSP 304 includes module identification information such as power supply group information (PGI) 305. PGI 305 can be indicative of the fact that the transceiver module 300 is operative to receive both standard voltage Vst and higher voltage Vh. Therefore, the presence of PGI 305 alone may be indicative of a high module power condition being satisfied. PGI 305 may be a simple data bit located at a particular location on the memory of the DSP 304. Alternatively, PGI 305 may be contained in the serial number information of the transceiver module 300. PGI 305 does not necessarily relate to a power class of the transceiver module 300. PGI 305 is requested from transceiver module 300 and provided to a host card upon connection of transceiver module 300 to said host card.

Module power supply 306 provides IF adaptation 308 to host with the correct standard voltage Vst. In this way, the IF to host communication operates at the power level specified in the MSA standard. The transceiver module 300 shown in FIG. 3 is therefore provided with extended capability over and above that of the standard, whilst still being fully compliant with any standard relevant to the particular module being implemented.

Transceiver module 300 is therefore operable to receive a supply rail input voltage, the supply rail input voltage being higher than an upper limit on a module output signal voltage The interface of the module still works according to the standard with Vst as the upper voltage for outgoing signals—independent of the supply voltage. This means that there is an internal generated Voltage domain which generates the standard voltage from the supply and all outgoing signals are referenced to this internal voltage and not the supply rail, as may be standard. This is seen in FIG. 3, with reference to module power supply 306.

Figure 4:
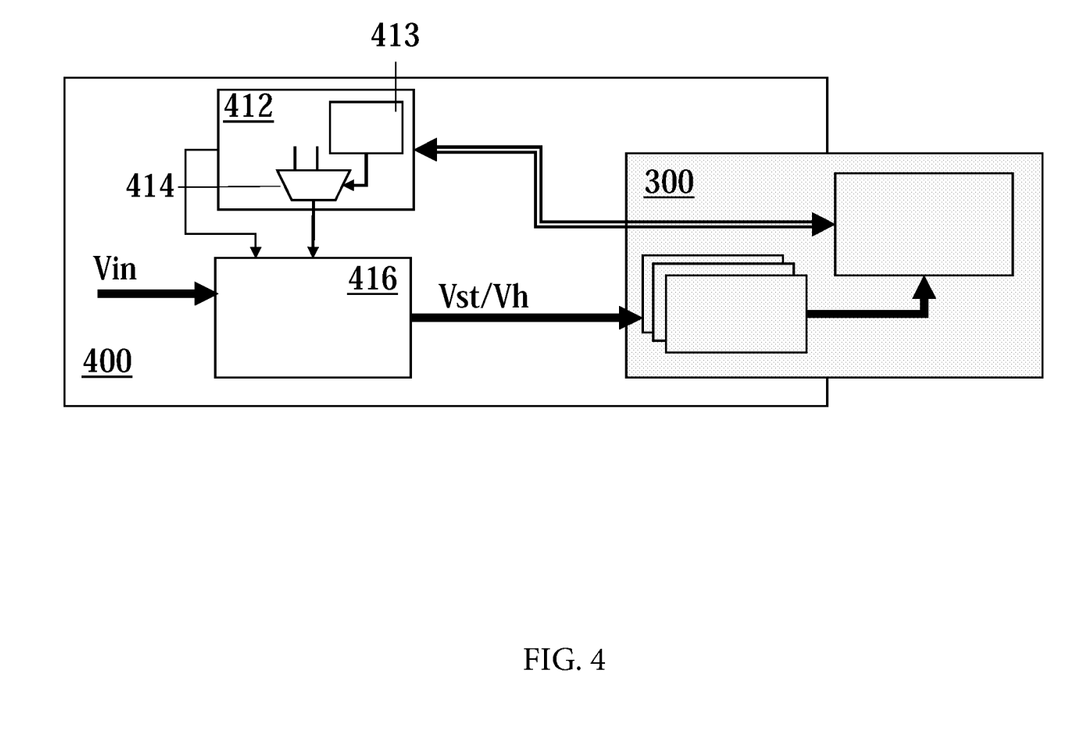
FIG. 4 is a block diagram of a host card having a slot for receiving a transceiver module.

FIG. 4 shows a host card operable to accept standard power and high power modules. Host card 400 has a transceiver module 300 located in the module receiver slot (not shown). Transceiver module 300 is in communication with host controller 412. Host card 400 provides power to transceiver module 300 from primary host power supply 416. Host controller 412 comprises module power state machine 413 which is in communication with output voltage selector 414.

The module power state machine 413 is an FSM (finite state machine) implemented in the host controller software or alternatively in hardware like a FPGA (field-programmable gate array). Functioning of the host controller 412, module power state machine 413 and output voltage selector 414 will be further described in relation to the approaches outlined below.

Primary host power supply 416 receives, for example, standard 12 voltage Vin power from the card (not shown). Primary host power supply 416 is operable to output standard voltage Vst, and in dependence on instructions received from the host controller via output voltage selector 414, it is operable to output standard voltages Vst or the higher voltage Vh to transceiver module 300. Primary host power supply 416 may be a switched mode power supply.

Host card controller may comprise a memory (not shown). The memory may comprise a list of transceiver module types which are able to receive a high input voltage Vh. The list may include serial numbers, or other representations of PGI. The host controller may be arranged to compare PGI received from the transceiver module to that stored in the memory to determine if the module power condition is satisfied.

Operation of the host card and module will now be described, with reference to FIG. 5.

A state diagram of the FSM is provided. It shows an implementation for the state machine in which the module power is set to Vh after the communication between card and module has been established and the module has been identified and stays at Vh until the module will be unplugged when the module power is set again Vst. In primary state (state 0) (step 501) the host card 400 module slot is empty. The host card is in a powered state of receiving Vin from the power circuitry of the network device in which it is employed. In the primary state (state 0) (step 501) the output voltage distributed from primary host power supply 416 is set to the standard voltage Vst. At 502 a transceiver module 100/300 is inserted into the slot. At 503, the presence of the transceiver module 100/300 causes the module present pin at the electrical connection between the host card 400 and the module to change state. The connection of the transceiver module to the host card is thus established. The module is powered at standard voltage Vst. The module is in low power (LP) mode once it has been inserted into the slot. While the module is in low power mode, communication between the host card and the module is possible. At this stage of the power cycle process, power dissipation is low, typically below 2 watts. At 504 host controller 412 communicates with the module DSP of the management interface of the module.

In general, the management interface of the transceiver module is a low speed serial interface. While the module is in low power mode, the host controller 412 requests management information on the module DSP in order to identify the power supply group of the module (the PGI information). The power supply group information (PGI) may be received in response to a specific request made over DSP. Requests may be information at a specific location on the module DSP. The PGI may be the serial number of the module. If any PGI is not present or the PGI indicates that the module is not operable to receive a higher voltage Vh, then the power method follows the process outlined above to boot the module into the low power mode.

If the PGI is recognised as identifying that module can take a higher voltage, the identification being made by module power state machine 413, in combination with output voltage selector 414, the state machine instructs primary host power supply to provide the higher voltage Vh to the module. The primary host power supply, DC/DC, is thereby configured to supply Vh by the relevant control pin. At 505, the primary host power supply or DC/DC changes the slot voltage provided to the module. When the high voltage Vh is reached at 506, the host controller may configure the transceiver module for high power mode (507). The host controller 412 sends the configuration messages over the low speed digital management interface. The card controller enables the transition to the high power mode as defined in the relevant MSA management interface specification. The module boots into the high power mode at 508 and in 509 reaches the high power mode. At 509 the communication on the high speed interface between the host card and transceiver module is running and the module and card are in normal operation mode.

At 510 the host controller 412 disables the high power mode, and the module transitions to the low power mode at 511. The module is in low power mode. No action is required from the module power state machine 413, the output voltage selector 414 or at the host card power supply. This is because the module is still plugged in and is able to receive Vh as the input voltage. The process will repeat from 506 if it is required that the module be placed into the high power mode for normal functionality.

If the module is unplugged at any stage of the aforementioned process, the following applies. The module interface pin changes state. In the QSFP example, pin MOD_SEL_L is pulled low in the module, and changes state, i.e. goes to high. The host controller 412 recognises the state change. The host controller 412 sets the primary host power supply 416 output to Vst. The host card controller then disables the host card module power supply (at 520); the slot is empty.

While the foregoing has been described in relation to QSFP, or QSFP-DD it may apply equally to the OSFP standard (and others). The signal names may be different and also the signalling for state pins such as module present or INIT mode. The foregoing is applicable for any kind of transceiver module such as CFP2, SFP where there is a need for higher power and under normal or standard conditions. It applies where there is a safe state during which at run time and after recognising the module via the PGI information, the voltage supplied to the module may be increased for normal high power operation. Transition states seen in 505, 506, 508 the increasing slot voltage and powering up of the module may be seen as a transition from low power to normal operation. The high power mode reached at 509, state 5, is normal operation mode.

Figure 6:
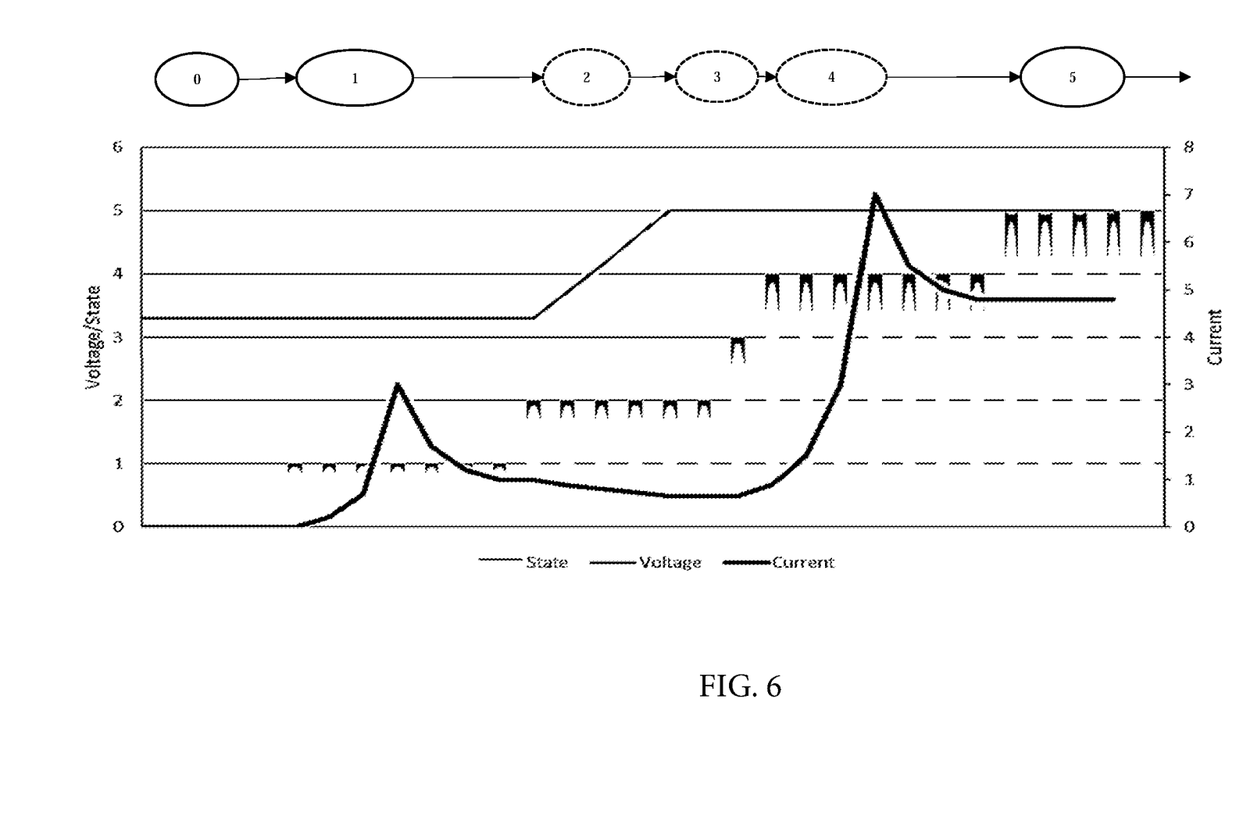
FIG. 6 is a diagram illustrating the power up timings method described herein.

FIG. 6 shows a power-up timing for the card and module. In state 0 (corresponding to step 501 described above), the slot is empty and zero current is being provided. The output voltage of the module is set at 3.3 volts, according to the QSFP example. A transceiver module is inserted taking the state to state 1. Current is applied to the module, bringing it into the low power mode. During the transition from low power to normal operation states 2, 3 and 4 which correspond to 504 to 508, the voltage is raised to high voltage level (in this example 5V), and subsequently the current is raised to bring the module into the high power mode, for normal operation—state 5 (509).

Figure 7:
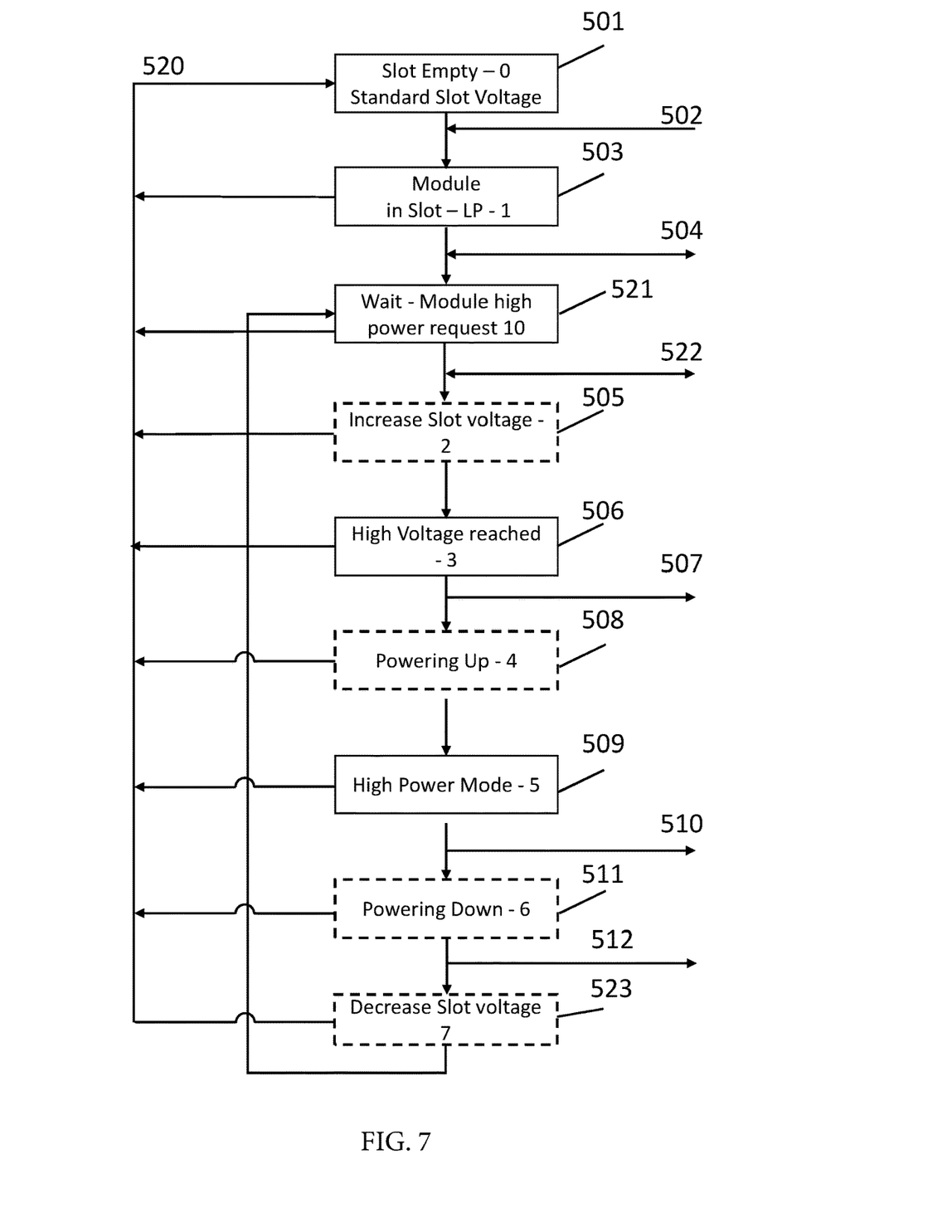
FIG. 7 is a flow diagram illustrating variant power supply states of a system described herein.

A second implementation of variant of an FSM is shown in FIG. 7. FIG. 7 shares many features of the method of FIG. 5 In the example shown the module power is only set to Vh during the time when the module is in high power mode or in transition between high and low power mode. At step 521 the module remains in low power mode, until communication is received from the host card to transition into high power mode (step 522). At step 523 slot voltage drops to Vst, returning to step 521.

Additional variants may exist without departing from the scope of the disclosure. State changes in the output voltage selector occur in the FSM states marked with 0, 2 and 7 respectively 501, 505 and 523 in the presented figure.

Unplugging the module at any state shown in FIG. 7 (step 520) will reset the FSM to primary state (state 0) (step 501) and accordingly set the module voltage to Vst. In other respects, the FSM is analogous to that shown in FIG. 5.

Figure 5:
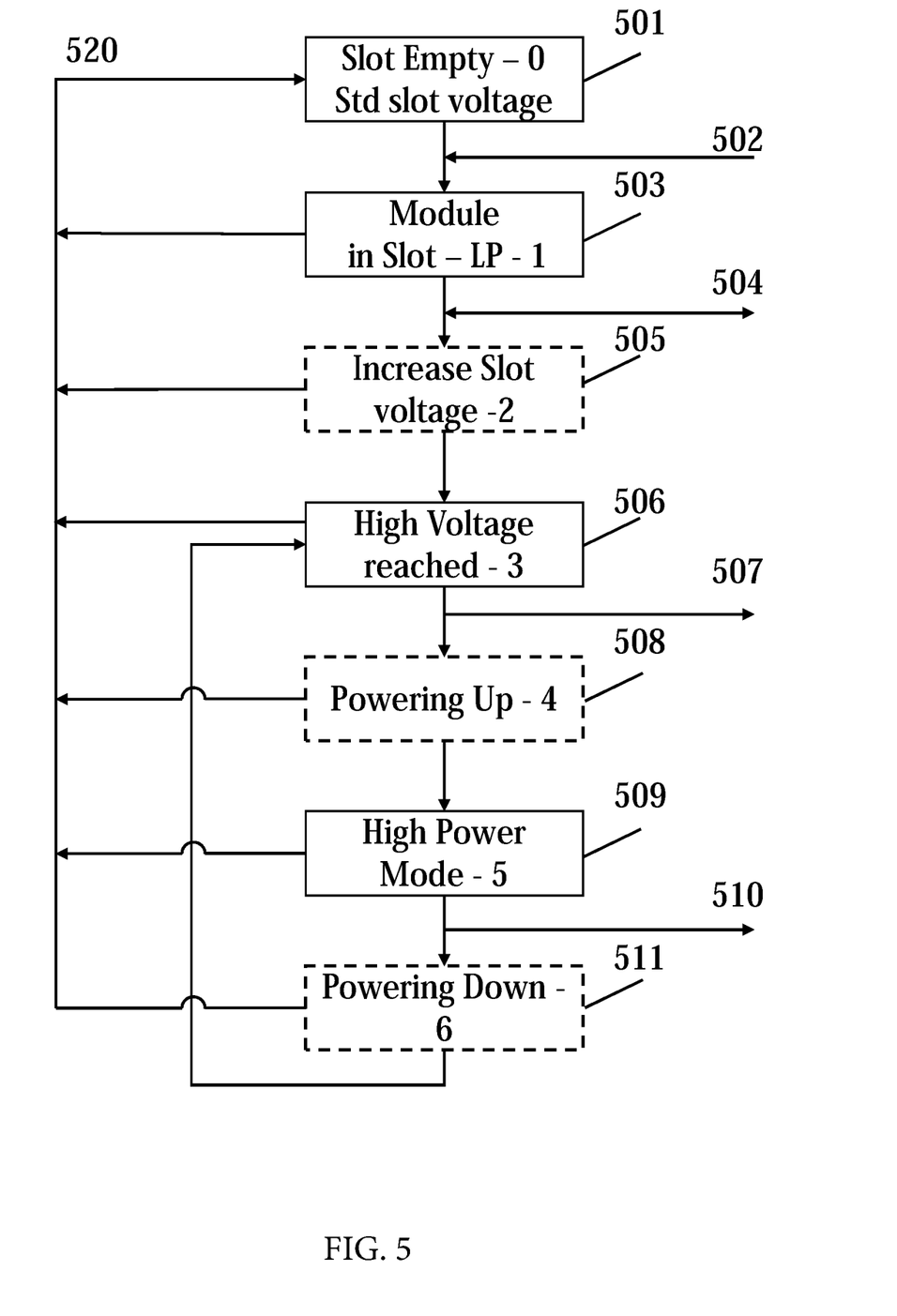
FIG. 5 is a flow diagram illustrating power supply states of a system described herein.

As will be understood by a skilled person, the method described herein may not require all of the steps of FIG. 5, or FIG. 7 to be performed. As an example, the method does not require the actual insertion of the card into the slot. The host card may poll the module for PGI information without having to establish the location of the module in the slot.

Although, in the above disclosure, the method has been set out for particular examples of optical transceiver modules, the skilled person will understand that the elements of the method described herein may be applied to other combinations of host card and transceiver module more generally.

An effect of the present disclosure is the provision of a system and method whereby a module is provided with the adequate power required to function at the necessary data rate. The module and host card, while being extended above and beyond the standards currently in place, nonetheless still conform to the relevant standards themselves.

Since, as it will be appreciated by the skilled person, and as mentioned in the specification of QSFP-DD, a host card together with the QSFP-DD module forms an integrated power system. The host supplies stable power to the module. Accordingly, the approach and system outlined herein requires that both card and module be adapted to provide/receive the higher voltage Vh for the system to function. An adapted host card may receive a standard module. The host card state machine determines that the card is not adapted to receive the higher voltage and provides Vst in the standard way.

It will be appreciated that a transceiver module adapted as described above will dissipate more power than standard modules.

It should be understood that, in the present disclosure, the verb 'to operate' may be used to mean 'to execute' or 'to run'.

Those skilled in the art will recognise that a wide variety of modifications, alterations, and combinations can be made with respect to the above described examples without departing from the scope of the disclosed concepts, and that such modifications, alterations, and combinations are to be viewed as being within the ambit of the disclosed concepts.

Those skilled in the art will also recognise that the scope of the invention is not limited by the examples described herein, but is instead defined by the appended claims.

The approaches described herein may be embodied on a computer-readable medium, which may be a non-transitory computer-readable medium. The computer-readable medium carries computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

Methods and apparatus for supplying power to a transceiver module, and in particular, to optical transceiver modules is provided herein. The transceiver module may be adapted to receive a standard and a high voltage for different modes of operation, and the host card may be operable to identify such a module, and to provide it with the higher voltage, from a multi-mode power supply. This obviates the need for using further pins in the electrical connection between host card and module.

In one form, a method is provided comprising: at a host card including a transceiver interface, establishing a connection of a transceiver module to the transceiver interface, the transceiver module being operable in a low power mode and a high power mode; requesting module identification information from the transceiver module; in response to receiving the module identification information, verifying a module power condition; and if the module power condition is verified, modifying an output voltage provided by a primary host power supply.

In another form, an apparatus is provided comprising: a transceiver interface; a primary host power supply; and a controller arranged to: connect a transceiver module to the transceiver interface, the transceiver module being operable in a low power mode and a high power mode; request module identification information comprising a module power condition from the transceiver module; and upon verification of the module power condition, modify an output voltage that is output from the primary host power supply and provided to the transceiver module.

In still another form, an apparatus is provided comprising: a digital signal processor (DSP); an input signal interface; one or more optical physical media dependent (PMD) interface; and a power supply module arranged to receive an input power signal and convert the input power signal to power the DSP and the one or more optical PMDs, wherein the apparatus is operable in a low power mode and a high power mode, and the power supply module further comprises a power converter arranged to receive a low power mode voltage and a high power mode voltage, the high power mode voltage being higher than the low power mode voltage.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a host card including a transceiver interface, establishing a connection of a transceiver module to the transceiver interface, the transceiver module being operable in a low power mode and a high power mode;
   requesting module identification information from the transceiver module;
   in response to receiving the module identification information, verifying a module power condition; and
   if the module power condition is verified, modifying an output voltage provided by a primary host power supply.

2. The method of claim 1, further comprising placing the transceiver module in the high power mode.

3. The method of claim 1, wherein the output voltage is provided to one or more power supply pins on the transceiver module.

4. The method of claim 1, wherein requesting the module identification information takes place while the transceiver module is operating in the low power mode.

5. The method of claim 4, wherein modifying the output voltage comprises increasing the output voltage from a standard voltage level to a high power voltage level.

6. The method of claim 1, wherein the host card requests the module identification information over a management interface.

7. The method of claim 1, wherein the transceiver interface and the transceiver module satisfy one of:
   the transceiver interface is a small form-factor pluggable (SFP) slot, and the transceiver module is an SFP transceiver;
   the transceiver interface is a quad small form-factor pluggable (QSFP) slot, and the transceiver module is a QSFP transceiver;
   the transceiver interface is a quad small form-factor pluggable double density (QSFP-DD) slot, and the transceiver module is a QSFP-DD transceiver; or
   the transceiver interface is an octal small form-factor pluggable (OSFP) slot, and the transceiver module is an OSFP transceiver.

8. The method of claim 1, further comprising, upon detection of removal of the transceiver module from the transceiver interface, setting the output voltage to a standard voltage level.

9. The method of claim 1, wherein the module power condition includes an indication that the transceiver module is operable to receive a supply rail input voltage, the supply rail input voltage being higher than an upper limit on a module output signal voltage.

10. An apparatus comprising:
    a transceiver interface;
    a primary host power supply; and
    a controller arranged to:
       connect a transceiver module to the transceiver interface, the transceiver module being operable in a low power mode and a high power mode;
       request module identification information comprising a module power condition from the transceiver module; and
       upon verification of the module power condition, modify an output voltage that is output from the primary host power supply and provided to the transceiver module.

11. The apparatus according to claim 10, wherein the controller is arranged to place the transceiver module in the high power mode.

12. The apparatus according to claim 10, wherein the primary host power supply is arranged to provide the output voltage to one or more power supply pins on the transceiver module.

13. The apparatus according to claim 10, wherein the controller is arranged to request the module identification information while the transceiver module is in the low power mode.

14. The apparatus according to claim 13, wherein the controller is arranged to modify the output voltage by increasing the output voltage from a standard voltage to a high power voltage level.

15. The apparatus according to claim 10, wherein the transceiver interface and the transceiver module satisfy one of the following:
    the transceiver interface is a small form-factor pluggable (SFP) slot, and the transceiver module is an SFP transceiver;
    the transceiver interface is a quad small form-factor pluggable (QSFP) slot, and the transceiver module is a QSFP transceiver;
    the transceiver interface is a quad small form-factor pluggable double density (QSFP-DD) slot, and the transceiver module is a QSFP-DD transceiver; or
    the transceiver interface is an octal small form-factor pluggable (OSFP) slot, and the transceiver module is an OSFP transceiver.

16. The apparatus according to claim 10, wherein the primary host power supply is a switched mode power supply.

17. An apparatus comprising:
a digital signal processor (DSP);
an input signal interface;
one or more optical physical media dependent (PMD) interface; and
a power supply module arranged to receive an input power signal and convert the input power signal to power the DSP and the one or more optical PMD interfaces,
wherein the apparatus is operable in a low power mode and a high power mode, and the power supply module further comprises a power converter arranged to receive a low power mode voltage and a high power mode voltage, the high power mode voltage being higher than the low power mode voltage.

18. The apparatus of claim 17, wherein the DSP further comprises power supply group information (PGI) indicative of a module power condition.

19. The apparatus of claim 17, wherein the apparatus is one of: a small form-factor pluggable (SFP) transceiver module, a quad small form-factor pluggable (QSFP) transceiver module, a quad small form-factor pluggable double density (QSFP-DD) transceiver module, or an octal small form factor pluggable (OSFP) transceiver module.

20. The apparatus of claim 17, wherein the power supply module is arranged to receive an input voltage higher than an upper limit on a module output voltage.

* * * * *